(12) United States Patent
Gopal et al.

(10) Patent No.: US 9,235,414 B2
(45) Date of Patent: Jan. 12, 2016

(54) SIMD INTEGER MULTIPLY-ACCUMULATE INSTRUCTION FOR MULTI-PRECISION ARITHMETIC

(75) Inventors: Vinodh Gopal, Westborough, MA (US); Gilbert M. Wolrich, Framingham, MA (US); Erdinc Ozturk, Marlborough, MA (US); James D. Guilford, Northborough, MA (US); Kirk S. Yap, Framingham, MA (US); Sean M. Gulley, Boston, MA (US); Wajdi K. Feghali, Boston, MA (US); Martin G. Dixon, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 396 days.

(21) Appl. No.: 13/992,728

(22) PCT Filed: Dec. 19, 2011

(86) PCT No.: PCT/US2011/065901
§ 371 (c)(1),
(2), (4) Date: Jun. 8, 2013

(87) PCT Pub. No.: WO2013/095338
PCT Pub. Date: Jun. 27, 2013

(65) Prior Publication Data
US 2014/0237218 A1    Aug. 21, 2014

(51) Int. Cl.
*G06F 7/52* (2006.01)
*G06F 9/30* (2006.01)
*G06F 9/38* (2006.01)

(52) U.S. Cl.
CPC .......... *G06F 9/3001* (2013.01); *G06F 9/30036* (2013.01); *G06F 9/30101* (2013.01); *G06F 9/3893* (2013.01)

(58) Field of Classification Search
CPC ....................................................... G06D 7/38
See application file for complete search history.

(56) References Cited

U.S. PATENT DOCUMENTS

| | | | |
|---|---|---|---|
| 5,121,431 A | 6/1992 | Wiener | |
| 6,370,559 B1 | 4/2002 | Hoffman | |
| 6,598,064 B1 | 7/2003 | Green | |
| 6,728,744 B2 * | 4/2004 | Amer | G06F 7/5324 708/625 |
| 7,107,305 B2 * | 9/2006 | Deng | G06F 7/5443 708/233 |

(Continued)

OTHER PUBLICATIONS

PCT International Search Report for PCT Counterpart Application No. PCT/US2011/065901, 3 pgs., (Jun. 25, 2012).

(Continued)

*Primary Examiner* — Cheng-Yuan Tseng
(74) *Attorney, Agent, or Firm* — Nicholson De Vos Webster & Elliot LLP

(57) ABSTRACT

A multiply-and-accumulate (MAC) instruction allows efficient execution of unsigned integer multiplications. The MAC instruction indicates a first vector register as a first operand, a second vector register as a second operand, and a third vector register as a destination. The first vector register stores a first factor, and the second vector register stores a partial sum. The MAC instruction is executed to multiply the first factor with an implicit second factor to generate a product, and to add the partial sum to the product to generate a result. The first factor, the implicit second factor and the partial sum have a same data width and the product has twice the data width. The most significant half of the result is stored in the third vector register, and the least significant half of the result is stored in the second vector register.

21 Claims, 13 Drawing Sheets

(56) References Cited

U.S. PATENT DOCUMENTS

| | | | |
|---|---|---|---|
| 7,366,873 B1 | 4/2008 | Kohn | |
| RE40,883 E * | 8/2009 | Pechanek | G06F 9/30036 708/496 |
| 7,672,989 B2 | 3/2010 | Dror et al. | |
| 7,793,073 B2 | 9/2010 | Kohn | |
| 8,549,264 B2 | 10/2013 | Gopal et al. | |
| 2003/0167460 A1 * | 9/2003 | Desai | G06F 1/3228 717/151 |

OTHER PUBLICATIONS

PCT Written Opinion of the International Searching Authority for PCT Counterpart Application No. PCT/US2011/065901, 3 pgs., (Jun. 25, 2012).

PCT Notification concerning Transmittal of International Preliminary Report on Patentability (Chapter I of the Patent Cooperation Treaty) for PCT Counterpart Application No. PCT/US2011/065901, 5 pgs., (Jul. 3, 2014).

PCT International Search Report for PCT Application No. PCT/US2011/067165, 3 pgs., (Aug. 28, 2012).

PCT Written Opinion of the International Searching Authority for PCT Application No. PCT/US2011/067165, 4 pgs., (Aug. 28, 2012).

PCT Notification concerning Transmittal of International Preliminary Report on Patentability (Chapter I of the Patent Cooperation Treaty) for PCT Application No. PCT/US2011/067165, 6 pgs., (Jul. 3, 2014).

* cited by examiner

```
vpmac3(zmm dst, zmm src1, zmm srcdst, int opsize){
    // zmm is 512-bits, opsize is one of {32, 64}
    for(i=0; i< 512; i=i + opsize){
        dst[i+opsize-1:i] = most-significant-half(ZMM0*src1[i+opsize-1:i] +srcdst[i+opsize-1:i]);
        srcdst[i+opsize-1:i] = least-significant-half(ZMM0*src1[i+opsize-1:i] +srcdst[i+opsize-1:i]);
        // unsigned mul-accumulate
    }
    return dst, srcdst;
}
```

FIG. 4A

```
vpadd_with_mask(zmm src1, zmm src2, mask ksrc, int opsize){
    // zmm is 512-bits, opsize is one of {32, 64}
    for(i=0; i< 512; i=i + opsize){
        kdst[i/opsize]:dest[i+opsize-1:i] = src1[i+opsize-1:i] + src2[i+opsize-1:i] + ksrc[i/opsize];
        // unsigned add, where kdst stores the carry-out for results wider than opsize
    }
    return {kdst, dest};
}
```

FIG. 4B

Sample Code 500

```
k0=0;
// Let zmm0 contain A_i. Note that we are working on multiple independent 1*N problems, one per lane of zmm.
// Let zmm8:zmm1 represent B_7:B_0
// Let zmm17:zmm9 represent S_8:S_0
// Let zmm25:zmm18 represent Hi_7:Hi_0
// vpmac3.q(Hi, B, S)....
vpmac3.q(zmm18, zmm1,zmm9) // Hi_0:S_0 = zmm0* B_0 + S_0 vpmac3.q(zmm19, zmm2,zmm10) // Hi_1:S_1 = zmm0* B_1 + S_1
zmm10, k0 = vpadd_with_mask(zmm10, zmm18, k0) // S_1 = S_1 + Hi_0 vpmac3.q(zmm20, zmm3,zmm11) // Hi_2:S_2 = zmm0* B_2 + S_2
zmm11, k0 = vpadd_with_mask(zmm11, zmm19, k0) // S_2 = S_2 + Hi_1
...
```

SIMD INTEGER MULTIPLY-ACCUMULATE INSTRUCTION FOR MULTI-PRECISION ARITHMETIC

CROSS-REFERENCE TO RELATED APPLICATION

This patent application is a U.S. National Phase Application under 35 U.S.C. §371 of International Application No. PCT/US2011/06591 filed Dec. 19, 2011, entitled, SIMD INTERGER MULTIPLY-ACCUMULATE INSTRUCTION FOR MULTI-PRECISION ARITHMETIC

FIELD OF TILE INVENTION

Embodiments of the invention relate generally to computer processor architecture, and, more specifically, to instructions which when executed cause a particular result.

DESCRIPTION OF THE RELATED ART

Many processors have Single Instruction, Multiple Data (SIMD) architectures. The SIMD architectures generally help to significantly improve processing speed. In SIMD architectures, instead of a scalar instruction operating on only one data element or pair of data elements, a vector instruction (also referred to as packed data instruction or SIMD instruction) may operate on multiple data elements or multiple pairs of data elements simultaneously or in parallel. The processor may have parallel execution hardware responsive to the vector instruction to perform the multiple operations simultaneously or in parallel.

In SIMD architectures multiple data elements may be packed within one register or memory location as packed data or vector data. In vector data, the bits of the register or other storage location may be logically divided into a sequence of multiple fixed-sized data elements. Each of the data elements may represent an individual piece of data that is stored in the register or storage location along with other data elements typically having the same size. For example, a 256-bit wide register may have four 64-bit wide vector elements, eight 32-bit wide vector elements, sixteen 16-bit wide vector elements, or thirty-two 8-bit wide vector elements. Each of the vector elements may represent a separate individual piece of data that may be operated upon separately or independently of the others.

Representatively, a vector add instruction may specify that a single vector operation (e.g., addition) be performed on all corresponding pairs of data elements from two source vector operands to generate a destination or result vector. The source vector operands may be of the same size, may contain data elements of the same width, and thus may each contain the same number of data elements. The source data elements in the same bit positions in the two source vector operands may represent pairs of corresponding data elements. The vector operation may be performed separately or independently on each of these pairs of corresponding source data elements to generate a matching number of result data elements, and thus each pair of corresponding source data elements may have a corresponding result data element. Typically, the result data elements for such an instruction are in the same order and they often have the same size.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

FIGS. 4A and 4B illustrate example embodiments of the MAC instructions and associated addition instructions, and the operations thereof.

FIG. 5 illustrates an example of sample code that includes the MAC instructions and associated addition instructions.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

In the following description, numerous specific details are set forth. However, it is understood that embodiments of the invention may be practiced without these specific details. In other instances, well-known circuits, structures and techniques have not been shown in detail in order not to obscure the understanding of this description.

Embodiments of the invention provide a mechanism for efficiently multiplying long integers. In particular, embodiments of the invention provide a mechanism for efficiently multiplying a large number of long integers in parallel.

Public key cryptographic operations generally incur long integer arithmetic that needs multi-precision multiplication. These operations such as modular exponentiation are highly computationally intensive. Often times a computer needs to handle a larger number of long integer multiplications and additions in a short time span. For example, a server that is responsible for setting up secure socket layer (SSL) transactions for an enterprise may receive a large number of connection requests from the enterprise clients in a short time span. Each transaction involves cryptographic operations that include integer multiplications and additions. Embodiments of the invention allow multiplications and additions arisen from multiple transactions to be processed simultaneously as multiple independent problems.

Figure 1:
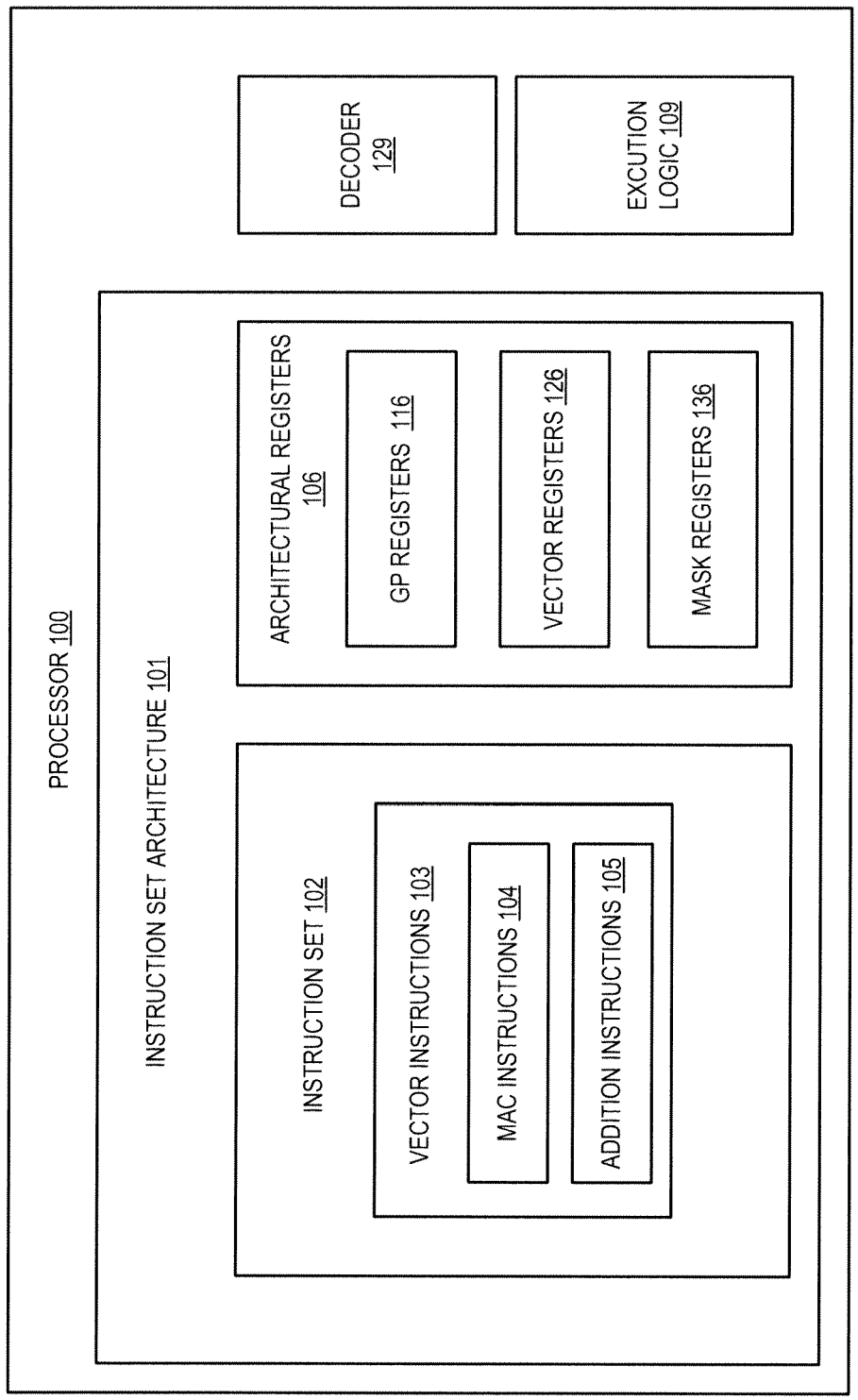
FIG. 1 is a block diagram of an example embodiment of a processor having an instruction set including one or more multiplication-and-accumulate (MAC) instructions.

FIG. 1 is a block diagram of an example embodiment of a processor 100. The processor 100 may be any of various complex instruction set computing (CISC) processors, various reduced instruction set computing (RISC) processors, various very long instruction word (VLIW) processors, various hybrids thereof, or other types of processors entirely. In one or more embodiments, the processor 100 may be a general-purpose processor (e.g., a general-purpose microprocessor of the type manufactured by Intel Corporation, of Santa Clara, Calif.), although this is not required. Alternatively, the instruction processing apparatus may be a special-purpose processor. Examples of suitable special-purpose processors include, but are not limited to, network processors, communications processors, cryptographic processors, graphics processors, co-processors, embedded processors, digital signal processors (DSPs), and controllers (e.g., microcontrollers), to name just a few examples.

The processor 100 has an instruction set architecture (ISA) 101. The instruction set architecture 101 represents the part of the architecture of the processor 100 related to programming. The instruction set architecture 101 commonly includes the native instructions, architectural registers, data types, addressing modes, memory architecture, interrupt and exception handling, and external input and output (I/O) of the processor 100. The instruction set architecture 101 is distinguished from the microarchitecture, which generally represents the particular processor design techniques selected to implement the instruction set architecture. Processors with different microarchitectures may share a common instruction set architecture. For example, certain microprocessors by Intel Corporation, of Santa Clara, Calif., and certain microprocessors of Advanced Micro Devices, Inc. of Sunnyvale, Calif., use substantially different internal microarchitectures to implement similar portions of the x86 instruction set.

The instruction set architecture 101 includes architectural registers (e.g., an architectural register file) 106. In one embodiment, the architectural registers 106 include general purpose (GP) registers 116, vector registers 126, mask registers 136, scalar floating-point registers (not shown), and other registers (not shown). Each of the vector registers 126 is operable to store a vector (or SIMD data). In one embodiment, the vector registers 126 includes a set of (e.g., 32) vector registers (e.g., zmm0 through zmm31). Each of the registers zmm0-zmm31 has the same width; e.g., 512 bits or other widths. In one embodiment, the mask registers 136 includes a set of (e.g., 8) mask registers (k0 through k7), each 64 bits wide. Other data widths can also be used. The use of the vector registers 126 and the mask registers 130 in connection with multiple-and-accumulate instructions and associated addition instructions will be described in further detail below with reference to FIG. 3.

The architectural registers 106 represent on-board processor storage locations. The architectural registers 106 may also be referred to herein simply as registers. Unless otherwise specified or clearly apparent, the phrases architectural register, register file, and register are used herein to refer to registers that are visible to the software and/or programmer (e.g., software-visible) and/or the registers that are specified by macroinstructions to identify operands. These registers 106 are contrasted to other non-architectural registers in a given microarchitecture (e.g., temporary registers, reorder buffers, retirement registers, etc.).

The illustrated instruction set architecture 101 also includes an instruction set 102 that is supported by the processor 100. The instruction set 102 includes several different types of instructions. These instructions of the instruction set 102 represent macroinstructions (e.g., instructions provided to the processor 100 for execution), as opposed to microinstructions or micro-ops (e.g., which result from a decoder 129 of the processor 100 decoding macroinstructions).

The instruction set 102 also includes one or more vector instructions 103. Each of the vector instructions 103 is operable to cause or result in the processor 100 performing a vector operation on data elements of one or more vector operands that are indicated by the instruction. Each of the vector instructions 103 can also use one or more masks to mask, predicate, or conditionally control the vector processing. The masks can be stored in the write mask registers (which are part of the architectural registers 106) and can represent mask operands, predicate operands, or conditional operation control operands.

The masks are operable to mask or conditionally control vector processing at per-data element granularity. For example, the masks may be operable to mask whether or not a result of a vector operation of the vector instruction 103, performed on individual data elements from a single source vector operand or individual pairs of corresponding data elements from two source vector operands, is to be stored in a vector result. The vector instructions 103 may allow vector processing of each data element or pair of corresponding data elements to be predicated or conditionally controlled separately and independently of the data elements. The vector instructions 103, operations, and masks may offer certain advantages, such as, for example, increased code density and/or higher instruction throughput.

In one embodiment, the vector instructions 103 include one or more vector multiplication instructions, such as multiple-and-accumulate (MAC) instructions 104 and their associated addition instructions 105. These instructions 104 and 105 are operable to cause or result in the processor 100 multiplying two large integer numbers, or multiplying several pairs of large integer numbers in parallel.

The processor 100 also includes execution logic 109. The execution logic 109 is operable to execute or process the instructions of the instruction set 102. The execution logic 109 may include execution units, functional units, arithmetic logic units, logic units, arithmetic units, etc. The processor 100 also includes a decoder 129 to decode macroinstructions into microinstructions or micro-ops for execution by the execution logic 109.

Figure 2:
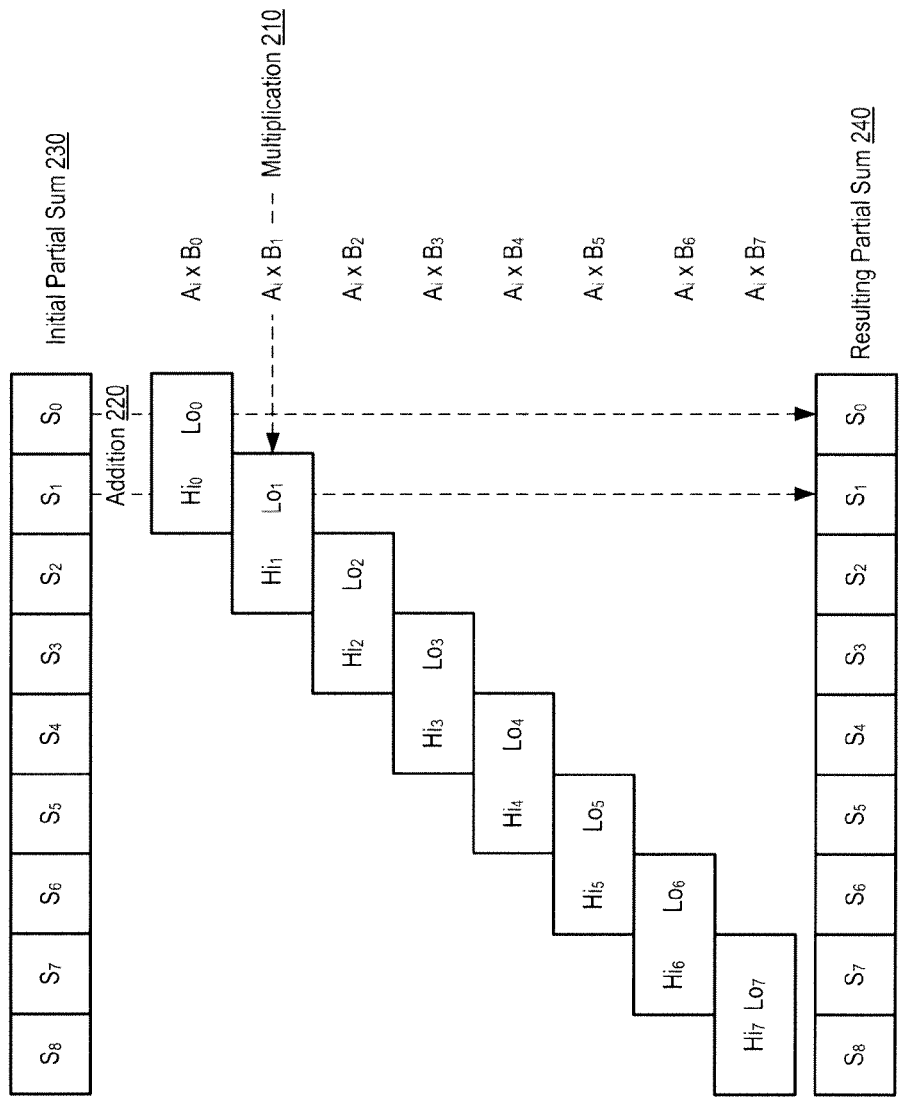
FIG. 2 illustrates an example of multiplication-and-accumulate operations.

To further explain embodiments of the MAC instructions 104, it may be helpful to consider an example of multiplying two factors, one factor being 1 quadword (Qword) and the other factor being N Qwords. Each Qword is 64 bits wide. FIG. 2 is a diagram illustrating an example embodiment of a basic operation that performs (1×N) Qword multiply-accumulate ($S[7:0]=A_i \times B[7:0]+S[7:0]$). In FIG. 2, S[7:0] on the top (indicated as 230) is the initial partial sum, and the S[7:0] on the bottom (indicated as 240) is the resulting partial sum. For each multiply operation 210 ($A_i \times B_n$, n=0, 1, . . . 7), a product of (64×64)=128 bits is generated. Each product is indicated as ($Hi_n:Lo_n$), shown as an entry in the diagonal of the diagram, where $Hi_n$ is the high-order part (i.e., the most significant half) and $Lo_n$ is the low-order part (i.e., the least significant half). This product can be added to a partial sum $S_n$ with minimal number of micro-operations (μops) and latencies. One way of adding the product to the partial sum takes 2 addition operations, with each addition operation using one independent carry chain:

$S_n = S_n + Lo_n$ (using a first carry chain)

$S_n = S_n + Hi_{n-1}$ (using a second carry chain).

Assuming that S[7:0] is initialized to all zeros. Following the example addition operation 220 indicated by the vertical dotted line shown in FIG. 2, the addition operations are equivalent to: $S_0 = S_0 + Lo_0$, $S_1 = S_1 + Lo_1 + Hi_0$, $S_2 = S_2 + Lo_2 + Hi_1$, $S_3 = S_3 + Lo_3 + Hi_2$, etc.

Embodiments of the invention provide multiply-and-addition (MAC) instructions that can multiple two long integers with a single carry chain. Rather than specify the multiply operation as a separate instruction, the MAC instructions 104 of FIG. 1 is SIMD in nature and works on unsigned integer operands. In the example of FIG. 2, $A_i$ is multiplied with $B_n$, n=0, 1, ... 7, where $A_i$ can be part of a first long integer A, and each of $B_n$ can be part of a second long integer B. The multiplication uses $S_n$, n=0, 1, ... 7, to store the partial sums. After the multiplication operations of ($A_0 \times B_n$, n=0, 1, ... 7), the computations can move on to $A_1 \times B_n$, $A_2 \times B_n$, and so on, until all parts of the long integer A are processed. Each of the multiplication operations can use $S_n$ to accumulate the partial sum. At the end, $S_n$ has the final result.

In one embodiment, the MAC instruction 104 of FIG. 1 is defined to perform:

$Hi_n = S_n = A_i \times B_n + S_n$ (Equation 1), followed by an addition instruction that uses a single carry chain (of add-with-carry) as:

$S_n = S_n + Hi_{n-1}$ (Equation 2).

The MAC instruction 104 generates a product that is twice the width of each of the factors ($A_i$ and $B_n$). Therefore, the MAC instruction 104 is defined to write the product into a pair of destination registers (for the least significant half of the product and the most significant half of the product). The MAC instructions 104 do not need to read or write any carry information, because the product is not larger than the width of the two destination registers.

In some embodiments, there may be a constraint that no more than three registers can be encoded in an instruction. Thus, it may be necessary to specify implicit register operands. Since $A_i$ does not change for the multiplication sequence (for multiplying $B_n$, n=0, 1, ... 7), it is convenient to use $A_i$ as an implicit source operand. Further, the MAC instruction 104 can use $S_n$ as the source as well as the destination for the least significant half of the product. Thus, in one embodiment, the MAC instruction 104 only needs to encode three explicit operands (i.e., $B_n$, the least significant half of the product and the most significant half of the product). The addition operation within the MAC instruction is chosen such that inputs to one MAC instruction 104 do not depend on the output of a previous MAC instruction 104. If a source operand of the MAC instruction 104 were to be generated by a previous MAC instruction, the effective computation time would be limited by the latency of the MAC instruction 104 and can negatively impact its performance.

The MAC instructions 104 can be applied to operands of 64 bits (Qwords), 32 bits (Dwords), or other widths. The width can be chosen based on performance requirement and implementation cost tradeoff. In one embodiment, the MAC instruction 104 for Qword sized operands is named vpmac3.q and can be specified as:

$zmmdst\_H, zmmsrcdst = ZMM0 \times zmmsrc1 + zmmsrcdst.$

The vpmac3.q instruction is an implementation of Equation 1 described above. It can be implemented with two or more uops, where the second uop can be used to write-back the most significant half of the product, thereby improving efficiency.

In the vpmac3.q instruction described above, ZMM0 is an implicit operand pre-loaded with $A_i$, zmmsrc1 is a source operand for storing $B_n$, zmmsrcdst is a source (as well as the destination) operand for storing $S_n$, and zmmdst_H is the destination for storing $Hi_n$. For multiplication of Qwords, each of the operands ZMM0, zmmsrc1, zmmsrcdst and zmmdst_H has a data width (dw) 64 bits wide. In an embodiment where a processor has 512 bits wide vector registers (i.e., vector width VW=512), each vector register can be divided into 8 "lanes," with each lane 64 bits wide (i.e., VW/dw=512/64=8). Thus, ZMM0, zmmsrc1, zmmsrcdst and zmmdst_H can occupy a lane in 4 different vector registers. The other 7 lanes in these vector registers can be used for 7 other MAC operations, each of which is executed as an independent multiplication problem.

Figure 3:
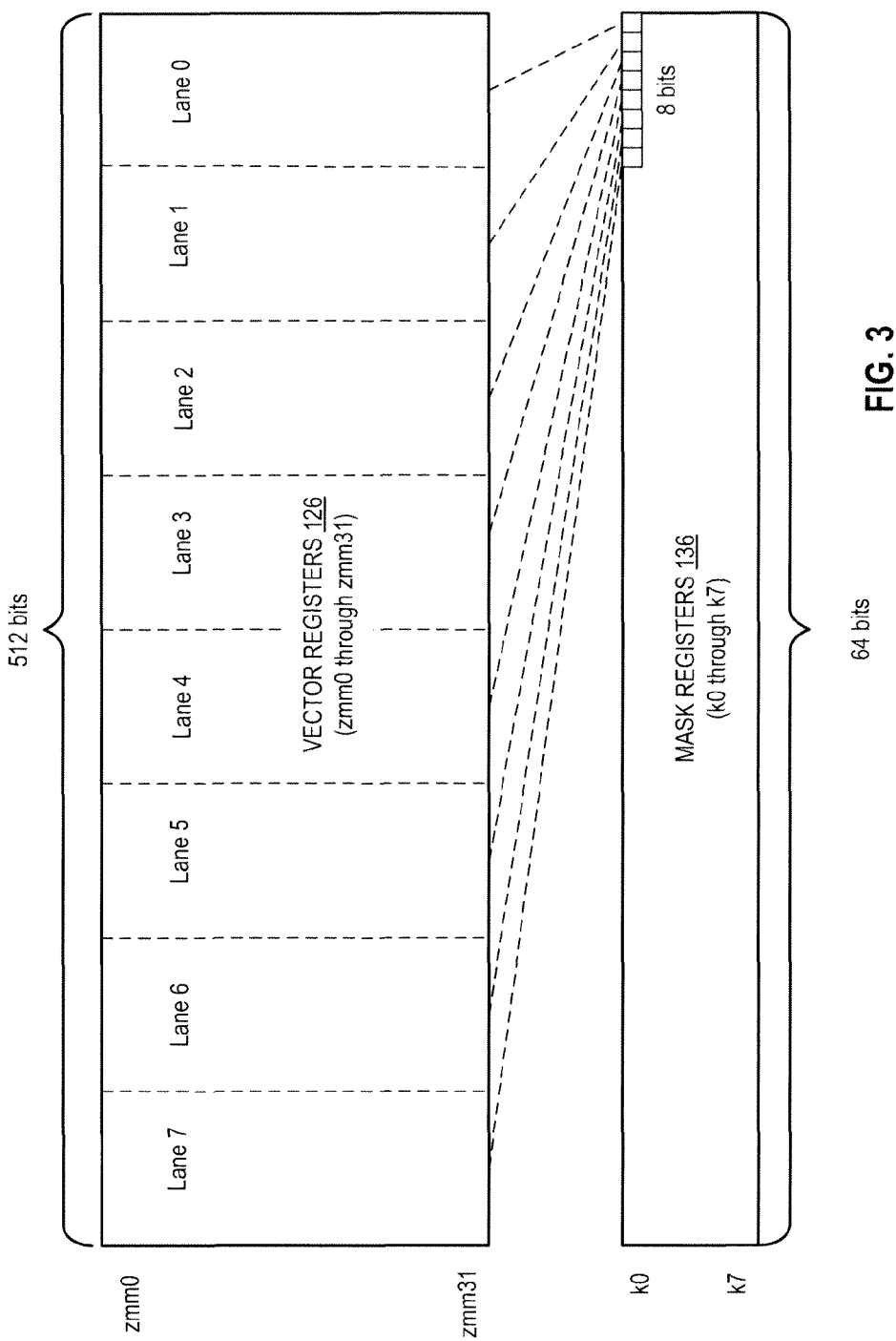
FIG. 3 illustrates an example embodiment of vector registers and mask registers used by the MAC instructions and associated addition instructions.

FIG. 3 is a block diagram illustrating the lanes in an embodiment of the vector registers 126 of FIG. 1 (e.g., zmm0 through zmm31). The vector registers 126 is also referred to as zmm registers 126. Each of the zmm registers 126 is 512 bits wide. For Qword operations, each zmm register 126 can be divided into 8 independent lanes and used as 8 independent buffers. In the above example of multiplying N Qwords by 1 Qword, the computation of the MAC instruction can use one lane of the zmm registers 126 for storing input and output operands. Thus, each of the operands ZMM0, zmmsrc1, zmmsrcdst and zmmdst_H can be the portion of the zmm registers 126 within one lane. The other lanes of the zmm registers 126 can be used for other independent MAC operations of the same size. Thus, the zmm registers 126 can be used as multiple buffers in the computation of multiple independent multiplications in parallel.

FIG. 4A is an example of pseudo-code that implements the MAC instruction 104 of FIG. 1 (e.g., vpmac3) for Qword and Dword operations. The instruction 104 can also be applied to other data widths. The pseudo-code shows that most significant half and the least significant half of the product computed by the MAC instruction 104 are stored in two different vector registers.

With respect to the addition operations following the MAC instruction 104 (shown in the example of FIG. 2 as the vertical dotted lines), one embodiment of the addition instruction 105 for Qword sized operands is named Add_with_mask.q and can be specified as:

$kdst:zmmdst = zmmsrc1 + zmmsrc2 + ksrc.$

The Add_with_mask.q instruction can be used to implement Equation 2 described above. The additions can be performed efficiently using vector registers (e.g., some of the zmm registers) and additional mask registers to indicate the carry information. In the Add_with_mask.q instruction, zmmsrc1 can be used to store input $S_n$, zmmsrc2 can be used to store $Hi_{n-1}$, ksrc can be used to store carry input, zmmdst can be used to store output $S_n$, and kdst can be used to store carry output.

In one embodiment, each of the ksrc and kdst can be a bit in mask registers (e.g., the mask registers 136 of FIG. 1 and FIG. 3) denoted by k0 through k8. Each bit can correspond to a lane of the zmm registers 126. In an embodiment where the zmm register is 512 bits wide, the mask for Qword sized operations needs to at least 8 bits wide (for 8 lanes). In an embodiment where the mask registers in a processor are 64 bits wide, the 8-bit mask can be a portion (e.g., the lower-order 8 bits) of a mask register. Thus, these mask registers are used in place of the traditional arithmetic flags (e.g., the carry flag) for scalar integer instructions.

FIG. 3 shows an embodiment of eight mask registers 136 (k0 through k7), each 64 bits wide. For the addition operation described above, 1 bit of k0 (or any of the other mask registers 136) can be used as the ksrc (for carry input) as well as the kdst (for carry output). Thus, the 8 lanes of independent computations correspond to 8 bits of k0 for carry information.

FIG. 4B is an example of pseudo-code (vpadd_with_mask) that implements the Add_with_mask instruction for operand sizes of Qword and Dword. This addition instruction can also be applied to other data widths. The pseudo-code shows that the result computed by the addition instruction is stored in two different registers; one for storing the sum (having the same data width as the operand size) and the other for storing the carry output (for the result wider than the operand size).

FIG. 5 is an example of sample code 500 for using the MAC instructions 104 and addition instructions 105 for computing 8 independent multiplication problems of the same operand size. In this sample code 500, each independent problem is to multiply 1×N Qwords. The sample code uses vector registers zmm0-zmm25, which can be the vector registers 126 of FIG. 3. Each independent multiplication uses one lane of the vector registers zmm0-zmm25. The factor $A_i$, is stored as an implicit operand in zmm0 (i.e., zmm0 stores 8 different $A_i$'s, one for each independent multiplication). Except for $A_i \times B_0$, the MAC instruction (vpmac3.q) for each $A_i \times B_n$ (n=1, ..., 7) is followed by an addition instruction (vpadd_with_mask). The sample code shows that there is no data dependency among successive MAC instructions. The sample code also shows that there is only one single carrier chain (e.g., one bit of the mask register k0) for each lane or each independent problem.

Figure 6:
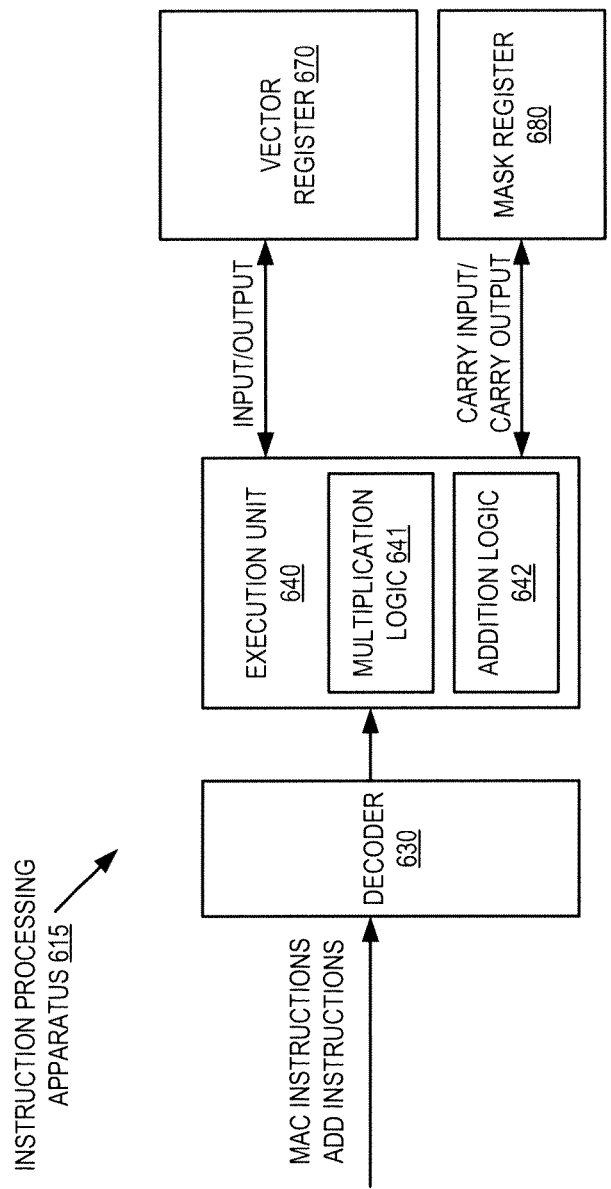
FIG. 6 is a block diagram of an example embodiment of an instruction processing apparatus having an execution unit that is operable to execute instructions including an example embodiment of the MAC instructions and associated addition instructions.

FIG. 6 is a block diagram of an example embodiment of an instruction processing apparatus 615 having an execution unit 640 that is operable to execute instructions including an example embodiment of the MAC instructions 104 and addition instructions 105 of FIG. 1. In some embodiments, the instruction processing apparatus 615 may be a processor and/or may be included in a processor (e.g., the processor 100 of FIG. 1, or one similar). Alternatively, the instruction processing apparatus 615 may be included in a different processor, or electronic system.

The instruction processing apparatus 615 receives one or more of the MAC instructions 104 and addition instructions 105. A decoder 630, which can be the decoder 129 of FIG. 1 or one similar, receives the instructions in the form of higher-level machine instructions or macroinstructions, and decodes them to generate lower-level micro-operations, micro-code entry points, microinstructions, or other lower-level instructions or control signals, which reflect and/or are derived from the original higher-level instruction. The lower-level instructions or control signals may implement the operation of the higher-level instruction through lower-level (e.g., circuit-level or hardware-level) operations. The decoder 630 may be implemented using various different mechanisms. Examples of suitable mechanisms include, but are not limited to, microcode random access memories (ROMs), look-up tables, hardware implementations, programmable logic arrays (PLAs), other mechanisms used to implement decoders known in the art, etc.

The execution unit 640 is coupled to the decoder 630. The execution unit 640 may receive from the decoder 630 one or more micro-operations, micro-code entry points, microinstructions, other instructions, or other control signals, which reflect, or are derived from the received MAC instructions 104 and addition instructions 105. The execution unit 640 includes multiplication logic 641 to perform multiplications, and addition logic 642 to perform additions.

The execution unit 640 also receives input from vector registers 670 (e.g., the vector registers 126 of FIG. 1 and FIG. 3) and stores output in the vector registers 670. The execution unit 640 receives carry input from the mask registers 680 (e.g., the mask registers 136 of FIG. 1 and FIG. 3) and stores carry output into the mask registers 680.

To avoid obscuring the description, a relatively simple instruction processing apparatus 615 has been shown and described. It is to be appreciated that other embodiments may have more than one execution unit. For example, the apparatus may include multiple different types of execution units, such as, for example, arithmetic units, arithmetic logic units (ALUs), integer units, floating point units, etc. At least one of these units may be responsive to an embodiment of a loop alignment instruction as disclosed herein. Still other embodiments of instruction processing apparatus or processors may have multiple cores, logical processors, or execution engines. An execution unit operable to execute one or more loop alignment instructions may be included within at least one, at least two, most, or all of the cores, logical processors, or execution engines.

The instruction processing apparatus 615 or processor may also optionally include one or more other well-known components. For example, other embodiments may include one or more of instruction fetch logic, scheduling logic, branch prediction logic, instruction and data caches, instruction and data translation lookaside buffers, prefetch buffers, microinstruction queues, microinstruction sequencers, bus interface units, second or higher level caches, instruction scheduling logic, retirement logic, register renaming logic, and the like, and various combinations thereof. It is to be appreciated that there are literally numerous different combinations and configurations of such components in processors, and that the scope of the invention is not limited to any known such combination or configuration.

Figure 7:
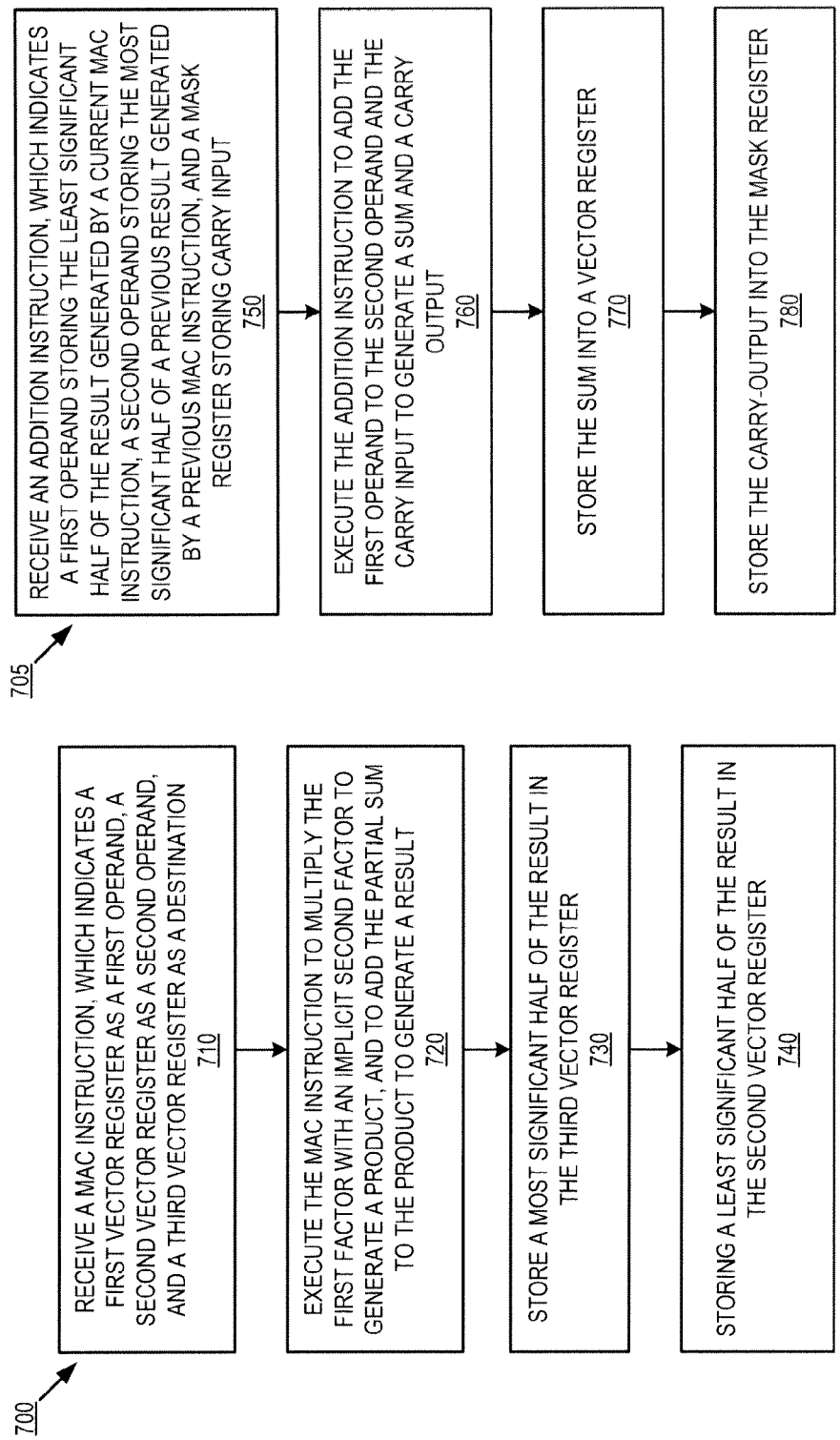
FIGS. 7A and 7B are flow diagrams illustrating example embodiments of methods for processing the MAC instructions and associated addition instructions.

FIGS. 7A and 7B are flow diagrams of an example embodiment of a method 700 and a method 705, respectively, of processing an example embodiment of a MAC instruction (such as the MAC instructions 104 of FIG. 1) and an addition instruction (such as the addition instructions 105 of FIG. 1). In various embodiments, the methods 700 and 705 may be performed by a general-purpose processor, a special-purpose processor (e.g., a graphics processor or a digital signal processor), or another type of digital logic device or instruction processing apparatus. In some embodiments, the methods 700 and 705 may be performed by the processor 100 of FIG. 1, or the instruction processing apparatus 615 of FIG. 6, or a similar processor or instruction processing apparatus. Alternatively, the methods 700 and 705 may be performed by different embodiments of processors or instruction processing apparatus. Moreover, the processor 100 of FIG. 1, and the instruction processing apparatus 615 of FIG. 6, may perform embodiments of operations and methods either the same as, similar to, or different than those of the methods 700 and 705.

In one embodiment, the method 700 includes a processor receiving a MAC instruction that indicates a first vector register as a first operand, a second vector register as a second operand, and a third vector register as a destination (block 710). The first vector register stores a first factor and the second vector register stores a partial sum of the MAC instruction. The MAC instruction is executed to multiply the first factor with an implicit second factor to generate a product, and to add the partial sum to the product to generate a result (block 720). The first factor, the implicit second factor and the partial sum have the same data width and the product has twice the data width. Further, the first factor, the implicit second factor and the partial sum are unsigned integers. The most significant half of the result is stored in the third vector register (block 730), and the least significant half of the result is stored in the second vector register (block 740).

In one embodiment, the method 705 includes a processor receiving an addition instruction that indicates a first operand, a second operand, and a mask register (block 750). The first operand stores the least significant half of the result generated by a current MAC instruction, the second operand stores the most significant half of a previous result generated by a previous MAC instruction, and the mask register stores carry input. The addition instruction is executed to add the first operand to the second operand and the carry input to generate a sum and a carry output (block 760). The sum is stored into a vector register (e.g., one of the zmm registers 136 of FIG. 3 within a lane) (block 770). In one embodiment, the vector register for storing the sum can be the same register indicated by the first operand. The carry output is stored into the mask register (e.g., a bit of the mask register) (block 780).

The illustrated method includes operations that are visible from outside a processor or instruction processing apparatus (e.g., from a software perspective). In other embodiments, the method may optionally include one or more other operations (e.g., one or more operations occurring internally within the processor or instruction processing apparatus). By way of example, after the instruction is received, the instruction may be decoded, translated, emulated, or otherwise converted, into one or more other instructions or control signals.

Exemplary Computer Systems and Processors—FIGS. 8-12

FIGS. 8-12 are exemplary computer systems and processors. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 8:
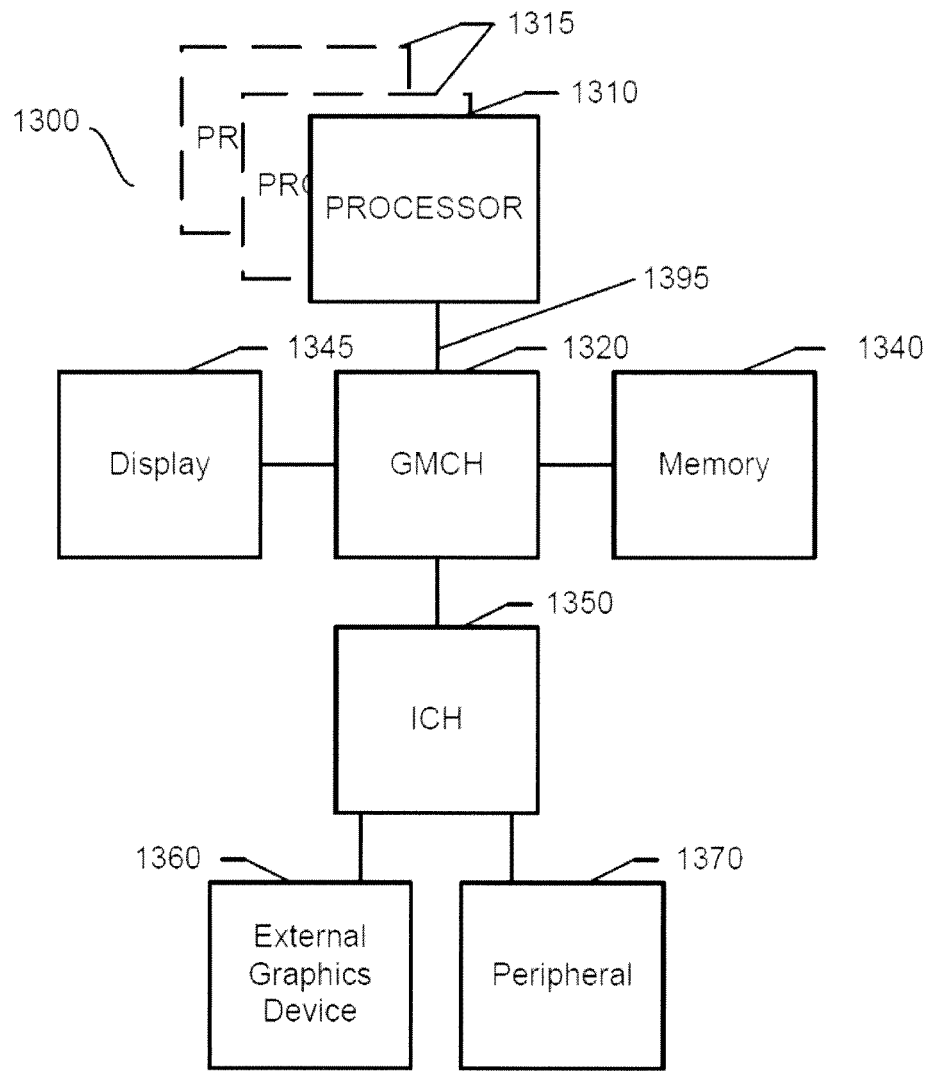
FIG. 8 is a block diagram of a system in accordance with one embodiment of the invention.

Referring now to FIG. 8, shown is a block diagram of a system 1300 in accordance with one embodiment of the invention. The system 1300 may include one or more processors 1310, 1315, which are coupled to graphics memory controller hub (GMCH) 1320. The optional nature of additional processors 1315 is denoted in FIG. 8 with broken lines.

Each processor 1310, 1315 may be some version of processor 1700. However, it should be noted that it is unlikely that integrated graphics logic and integrated memory control units would exist in the processors 1310, 1315.

FIG. 8 illustrates that the GMCH 1320 may be coupled to a memory 1340 that may be, for example, a dynamic random access memory (DRAM). The DRAM may, for at least one embodiment, be associated with a non-volatile cache.

The GMCH 1320 may be a chipset, or a portion of a chipset. The GMCH 1320 may communicate with the processor(s) 1310, 1315 and control interaction between the processor(s) 1310, 1315 and memory 1340. The GMCH 1320 may also act as an accelerated bus interface between the processor(s) 1310, 1315 and other elements of the system 1300. For at least one embodiment, the GMCH 1320 communicates with the processor(s) 1310, 1315 via a multi-drop bus, such as a frontside bus (FSB) 1395.

Furthermore, GMCH 1320 is coupled to a display 1345 (such as a flat panel display). GMCH 1320 may include an integrated graphics accelerator. GMCH 1320 is further coupled to an input/output (I/O) controller hub (ICH) 1350, which may be used to couple various peripheral devices to system 1300. Shown for example in the embodiment of FIG. 8 is an external graphics device 1360, which may be a discrete graphics device coupled to ICH 1350, along with another peripheral device 1370.

Alternatively, additional or different processors may also be present in the system 1300. For example, additional processor(s) 1315 may include additional processors(s) that are the same as processor 1310, additional processor(s) that are heterogeneous or asymmetric to processor 1310, accelerators (such as, e.g., graphics accelerators or digital signal processing (DSP) units), field programmable gate arrays, or any other processor. There can be a variety of differences between the physical resources 1310, 1315 in terms of a spectrum of metrics of merit including architectural, micro-architectural, thermal, power consumption characteristics, and the like. These differences may effectively manifest themselves as asymmetry and heterogeneity amongst the processing elements 1310, 1315. For at least one embodiment, the various processing elements 1310, 1315 may reside in the same die package.

Figure 9:
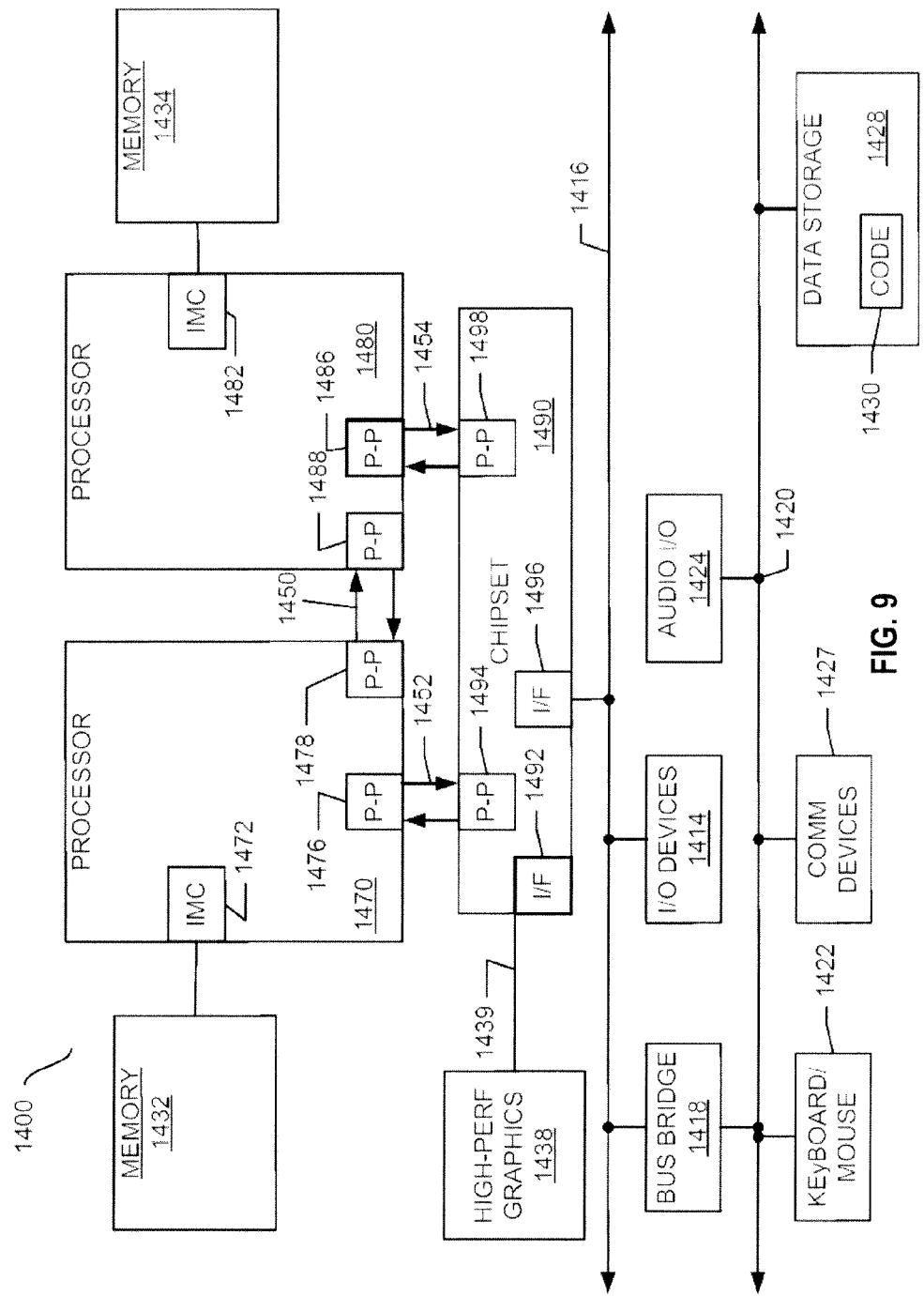
FIG. 9 is a block diagram of a second system in accordance with an embodiment of the invention.

Referring now to FIG. 9, shown is a block diagram of a second system 1400 in accordance with an embodiment of the present invention. As shown in FIG. 9, multiprocessor system 1400 is a point-to-point interconnect system, and includes a first processor 1470 and a second processor 1480 coupled via a point-to-point interconnect 1450. As shown in FIG. 9, each of processors 1470 and 1480 may be some version of the processor 1700.

Alternatively, one or more of processors 1470, 1480 may be an element other than a processor, such as an accelerator or a field programmable gate array.

While shown with only two processors 1470, 1480, it is to be understood that the scope of the present invention is not so limited. In other embodiments, one or more additional processing elements may be present in a given processor.

Processor 1470 may further include an integrated memory controller hub (IMC) 1472 and point-to-point (P-P) interfaces 1476 and 1478. Similarly, second processor 1480 may include a IMC 1482 and P-P interfaces 1486 and 1488. Processors 1470, 1480 may exchange data via a point-to-point (PtP) interface 1450 using PtP interface circuits 1478, 1488. As shown in FIG. 9, IMC's 1472 and 1482 couple the processors to respective memories, namely a memory 1442 and a memory 1444, which may be portions of main memory locally attached to the respective processors.

Processors 1470, 1480 may each exchange data with a chipset 1490 via individual P-P interfaces 1452, 1454 using point to point interface circuits 1476, 1494, 1486, 1498. Chipset 1490 may also exchange data with a high-performance graphics circuit 1438 via a high-performance graphics interface 1439.

A shared cache (not shown) may be included in either processor outside of both processors, yet connected with the processors via P-P interconnect, such that either or both processors' local cache information may be stored in the shared cache if a processor is placed into a low power mode.

Chipset 1490 may be coupled to a first bus 1416 via an interface 1496. In one embodiment, first bus 1416 may be a Peripheral Component Interconnect (PCI) bus, or a bus such as a PCI Express bus or another third generation I/O interconnect bus, although the scope of the present invention is not so limited.

As shown in FIG. 9, various I/O devices 1414 may be coupled to first bus 1416, along with a bus bridge 1418 which couples first bus 1416 to a second bus 1420. In one embodiment, second bus 1420 may be a low pin count (LPC) bus. Various devices may be coupled to second bus 1420 including, for example, a keyboard/mouse 1422, communication devices 1426 and a data storage unit 1428 such as a disk drive or other mass storage device which may include code 1430, in one embodiment. Further, an audio I/O 1424 may be coupled to second bus 1420. Note that other architectures are possible. For example, instead of the point-to-point architecture of FIG. 9, a system may implement a multi-drop bus or other such architecture.

Figure 10:
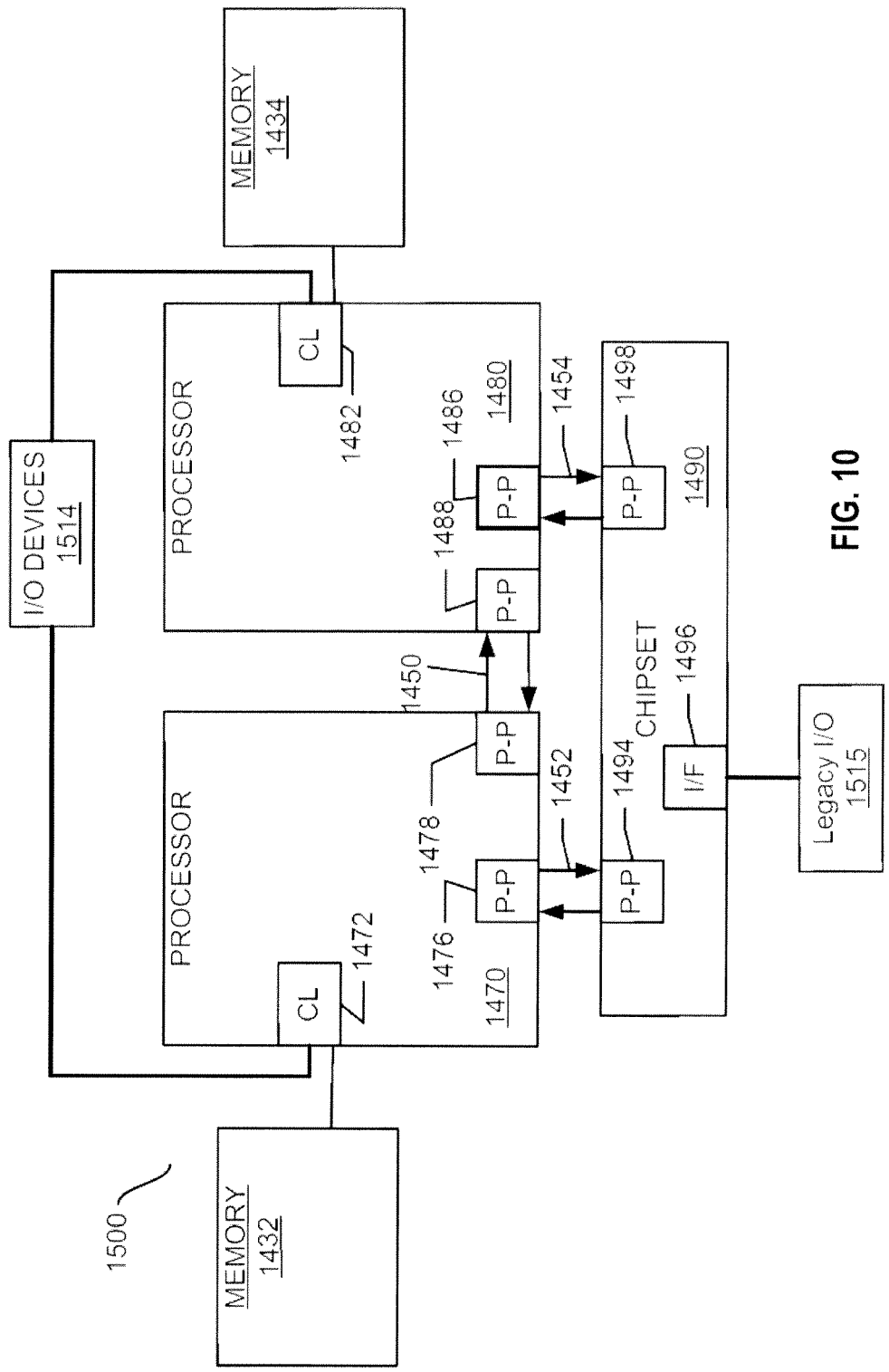
FIG. 10 is a block diagram of a third system in accordance with an embodiment of the invention.

Referring now to FIG. 10, shown is a block diagram of a third system 1500 in accordance with an embodiment of the present invention. Like elements in FIGS. 9 and 10 bear like reference numerals, and certain aspects of FIG. 9 have been omitted from FIG. 10 in order to avoid obscuring other aspects of FIG. 10.

FIG. 10 illustrates that the processing elements 1470, 1480 may include integrated memory and I/O control logic ("CL") 1472 and 1482, respectively. For at least one embodiment, the CL 1472, 1482 may include memory controller hub logic (IMC) such as that described above in connection with FIGS. 89 and 14. In addition. CL 1472, 1482 may also include I/O control logic. FIG. 15 illustrates that not only are the memories 1442, 1444 coupled to the CL 1472, 1482, but also that I/O devices 1514 are also coupled to the control logic 1472, 1482. Legacy I/O devices 1515 are coupled to the chipset 1490.

Figure 11:
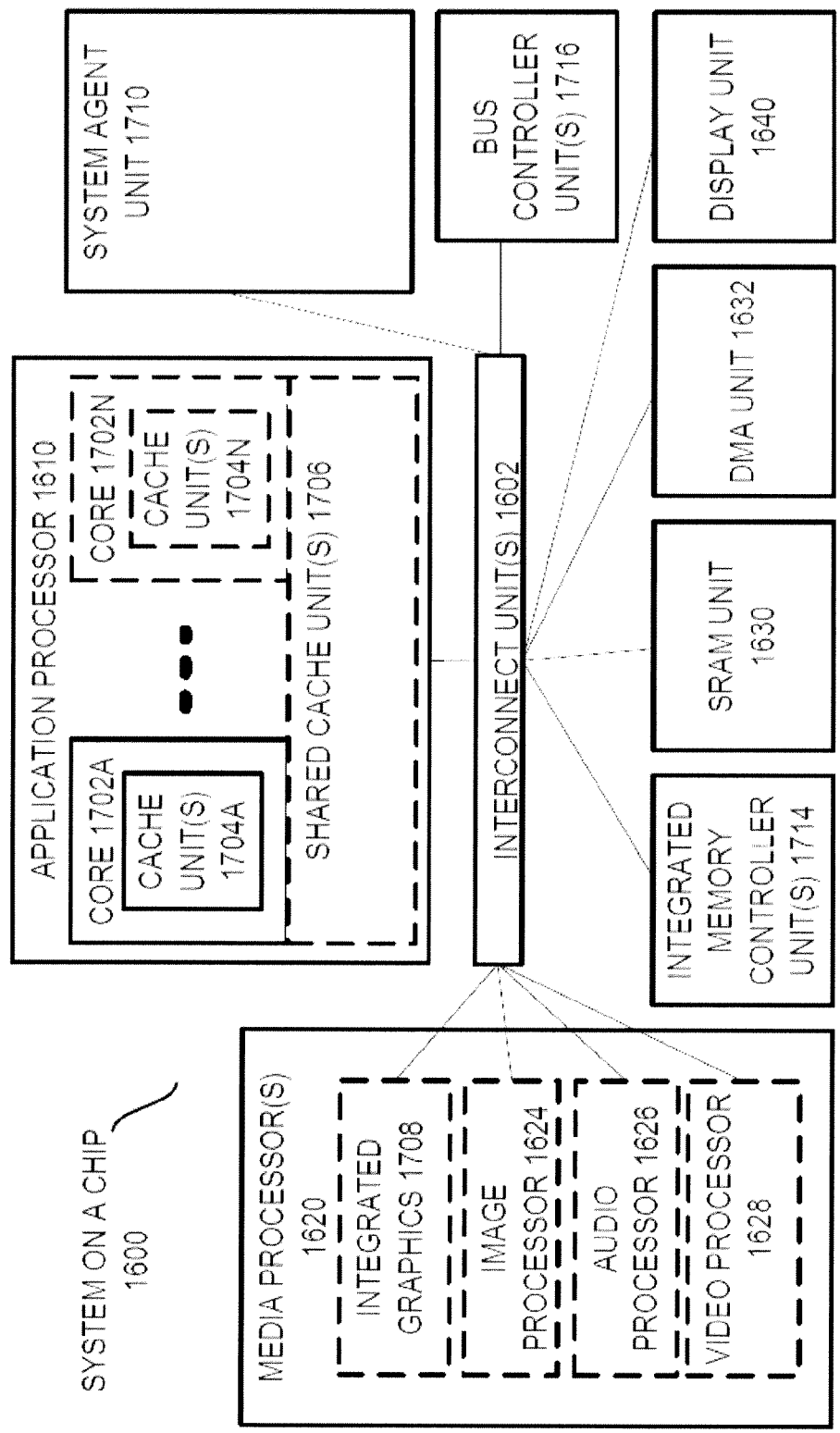
FIG. 11 is a block diagram of a system-on-a-chip (SoC) in accordance with an embodiment of the invention.
Figure 12:
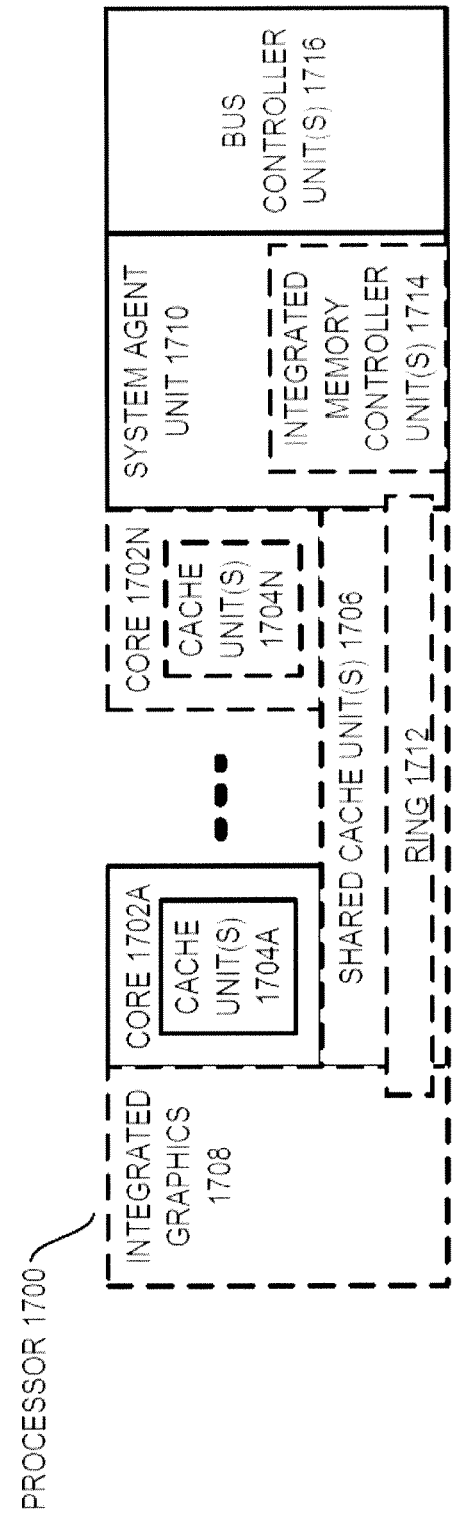
FIG. 12 is a block diagram of a single core processor and a multicore processor with integrated memory controller and graphics according to embodiments of the invention.

Referring now to FIG. 11, shown is a block diagram of a SoC 1600 in accordance with an embodiment of the present invention. Similar elements in FIG. 12 bear like reference numerals. Also, dashed lined boxes are optional features on more advanced SoCs. In FIG. 11, an interconnect unit(s) 1602 is coupled to: an application processor 1610 which includes a set of one or more cores 1702A-N and shared cache unit(s) 1706; a system agent unit 1710; a bus controller unit(s) 1716; an integrated memory controller unit(s) 1714; a set or one or more media processors 1620 which may include integrated graphics logic 1708, an image processor 1624 for providing still and/or video camera functionality, an audio processor 1626 for providing hardware audio acceleration, and a video processor 1628 for providing video encode/decode acceleration; an static random access memory (SRAM) unit 1630; a direct memory access (DMA) unit 1632; and a display unit 1640 for coupling to one or more external displays.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code may be applied to input data to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks (compact disk read-only memories (CD-ROMs), compact disk rewritables (CD-RWs)), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Accordingly, embodiments of the invention also include non-transitory, tangible machine-readable media containing instructions the vector friendly instruction format or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 13:
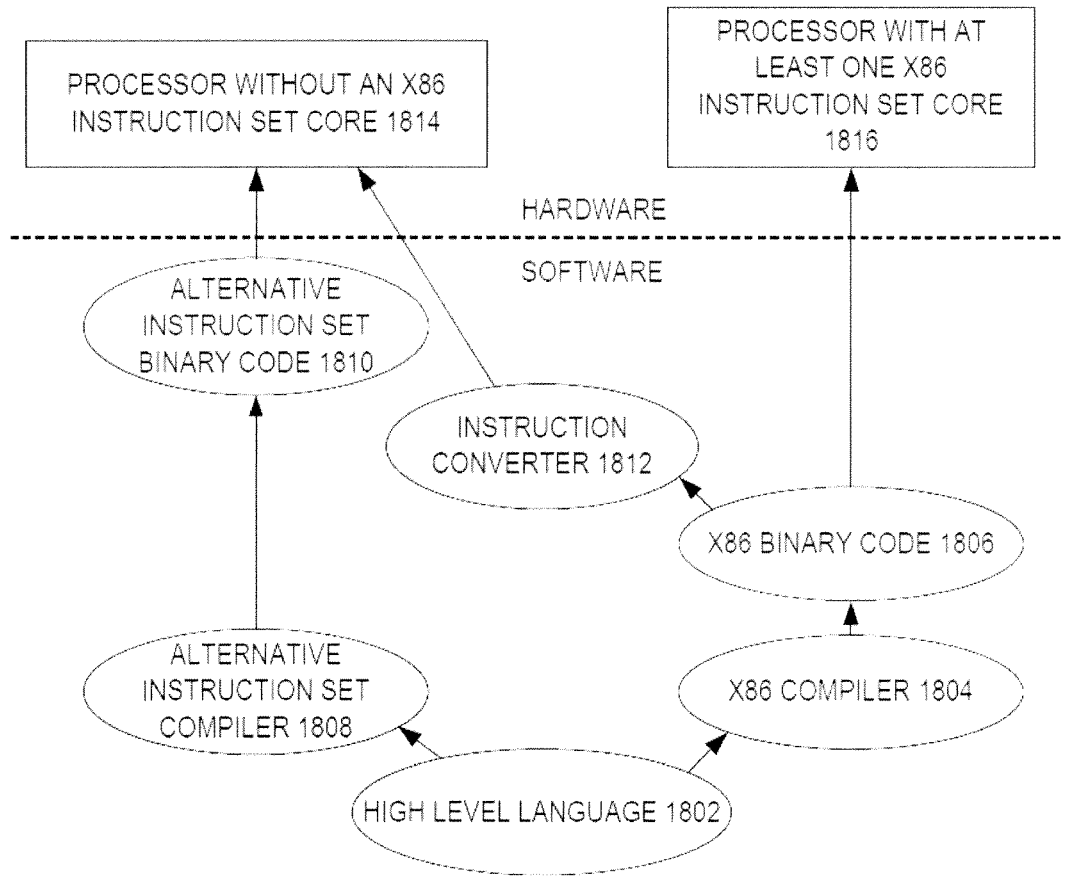
FIG. 13 is a block diagram contrasting the use of a software instruction converter to convert binary instructions in a source instruction set to binary instructions in a target instruction set according to embodiments of the invention.

FIG. 13 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 13 shows a program in a high level language 1802 may be compiled using an x86 compiler 1804 to generate x86 binary code 1806 that may be natively executed by a processor with at least one x86 instruction set core 1816 (it is assume that some of the instructions that were compiled are in the vector friendly instruction format). The processor with at least one x86 instruction set core 1816 represents any processor that can perform substantially the same functions as a Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1804 represents a compiler that is operable to generate x86 binary code 1806 (e.g., object code) that can, with or without additional linkage processing, be executed on the processor with at least one x86 instruction set core 1816. Similarly, FIG. 13 shows the program in the high level language 1802 may be compiled using an alternative instruction set compiler 1808 to generate alternative instruction set binary code 1810 that may be natively executed by a processor without at least one x86 instruction set core 1814 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1812 is used to convert the x86 binary code 1806 into code that may be natively executed by the processor without an x86 instruction set core 1814. This converted code is not likely to be the same as the alternative instruction set binary code 1810 because an instruction converter capable of this is difficult to make; however, the converted code will accomplish the general operation and be made up of instructions from the alternative instruction set. Thus, the instruction converter 1812 represents software, firmware, hardware, or a combination thereof that, through emulation, simulation or any other process, allows a processor or other electronic device that does not have an x86 instruction set processor or core to execute the x86 binary code 1806.

Certain operations of the instruction(s) in the vector friendly instruction format disclosed herein may be performed by hardware components and may be embodied in machine-executable instructions that are used to cause, or at least result in, a circuit or other hardware component programmed with the instructions performing the operations. The circuit may include a general-purpose or special-purpose processor, or logic circuit, to name just a few examples. The operations may also optionally be performed by a combination of hardware and software. Execution logic and/or a processor may include specific or particular circuitry or other logic responsive to a machine instruction or one or more control signals derived from the machine instruction to store an instruction specified result operand. For example, embodiments of the instruction(s) disclosed herein may be executed in one or more the systems of FIGS. 8-12 and embodiments of the instruction(s) in the vector friendly instruction format may be stored in program code to be executed in the systems. Additionally, the processing elements of these figures may utilize one of the detailed pipelines and/or architectures (e.g., the in-order and out-of-order architectures) detailed herein. For example, the decode unit of the in-order architecture may decode the instruction(s), pass the decoded instruction to a vector or scalar unit, etc.

The above description is intended to illustrate preferred embodiments of the present invention. From the discussion above it should also be apparent that especially in such an area of technology, where growth is fast and further advancements are not easily foreseen, the invention can may be modified in arrangement and detail by those skilled in the art without departing from the principles of the present invention within the scope of the accompanying claims and their equivalents. For example, one or more operations of a method may be combined or further broken apart.

Alternative Embodiments

While embodiments have been described which would natively execute the vector friendly instruction format, alternative embodiments of the invention may execute the vector friendly instruction format through an emulation layer running on a processor that executes a different instruction set (e.g., a processor that executes the MIPS instruction set of MIPS Technologies of Sunnyvale, Calif., a processor that executes the ARM instruction set of ARM Holdings of Sunnyvale, Calif.). Also, while the flow diagrams in the figures show a particular order of operations performed by certain embodiments of the invention, it should be understood that such order is exemplary (e.g., alternative embodiments may perform the operations in a different order, combine certain operations, overlap certain operations, etc.).

In the description above, for the purposes of explanation, numerous specific details have been set forth in order to provide a thorough understanding of the embodiments of the invention. It will be apparent however, to one skilled in the art, that one or more other embodiments may be practiced without some of these specific details. The particular embodiments described are not provided to limit the invention but to illustrate embodiments of the invention. The scope of the invention is not to be determined by the specific examples provided above but only by the claims below.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   receiving a multiply-and-accumulate (MAC) instruction for unsigned integer operations, the MAC instruction indicating a first vector register as a first operand, a second vector register as a second operand, and a third vector register as a destination, the first vector register storing a first factor and the second vector register storing a partial sum of the MAC instruction; executing the MAC instruction to multiply the first factor with an implicit second factor to generate a product, and to add the partial sum to the product to generate a result, wherein the first factor, the implicit second factor and the partial sum have a same data width and the product has twice the data width;
   storing a most significant half of the result in the third vector register; and
   storing a least significant half of the result in the second vector register.

2. The method of claim 1, wherein the first vector register stores a plurality of first factors of a plurality of multiplications, the second vector register stores a plurality of partial sums of the plurality of multiplications, and wherein executing the MAC instruction further comprises:
   executing the MAC instruction to perform the plurality of multiplications in parallel.

3. The method of claim 1, wherein each of the first operand, the implicit second operand, the partial sum, the most significant half of the product and the least significant half of the product has the same data width (dw), and wherein the first, second and third vector registers belong to a set of vector registers, each vector register in the set having a vector width (VW) and including (VW/dw) number of lanes with each lane used by one independent multiplication.

4. The method of claim 1, further comprising:
   loading the implicit second factor into a vector register; and
   executing a sequence of MAC instructions to multiply the implicit second factor with a sequence of first factors.

5. The method of claim 4, wherein the MAC instruction is one of a sequence of MAC instructions for multiplying two unsigned integers, and wherein the first factor and the implicit second factor are fractional portions of the two unsigned integers, respectively, and wherein inputs to the MAC instruction are independent of outputs of a previous MAC instruction in the sequence.

6. The method of claim 1, wherein, subsequent to executing the MAC instruction, the method further comprising:
executing an addition instruction to add the least significant half of the result to the most significant half of a previous result generated by a previous MAC instruction.

7. The method of claim 6, wherein the addition instruction receives carry input from a mask register and stores carry output into the mask register.

8. An apparatus comprising:
decoding logic to receive and decode a multiply-and-accumulate (MAC) instruction for unsigned integer operations, the MAC instruction to indicate a first vector register as a first operand, a second vector register as a second operand, and a third vector register as a destination, the first vector register to store a first factor and the second vector register to store a partial sum of the MAC instruction;
execution logic coupled to the decoding logic to multiply the first factor with an implicit second factor to generate a product, and to add the partial sum to the product to generate a result, wherein the first factor, the implicit second factor and the partial sum have a same data width and the product has twice the data width; and
a set of vector registers coupled to the execution logic, wherein the set of vector registers include the third vector register to store a most significant half of the result, and the second vector register to store a least significant half of the result.

9. The apparatus of claim 8, wherein the first vector register stores a plurality of first factors of a plurality of multiplications, the second vector register stores a plurality of partial sums of the plurality of multiplications, and wherein the execution logic is to execute the MAC instruction to perform the plurality of multiplications in parallel.

10. The apparatus of claim 8, wherein each of the first operand, the implicit second operand, the partial sum, the most significant half of the product and the least significant half of the product has the same data width (dw), and wherein the first, second and third vector registers belong to a set of vector registers, and wherein each vector register in the set has a vector width (VW) and includes (VW/dw) number of lanes with each lane used by one independent multiplication.

11. The apparatus of claim 8, wherein one of the set of vector registers is loaded with the implicit second factor of the multiplication, and wherein the executing logic is to execute a sequence of MAC instructions to multiply the implicit second factor with a sequence of first factors.

12. The apparatus of claim 11, wherein the MAC instruction is one of a sequence of MAC instructions for multiplying two unsigned integers, and wherein the first factor and the implicit second factor are fractional portions of the two unsigned integers, respectively, and wherein inputs to the MAC instruction are independent of outputs of a previous MAC instruction in the sequence.

13. The apparatus of claim 8, wherein, subsequent to executing the MAC instruction, the execution logic in response to an addition instruction is to add the least significant half of the result to the most significant half of a previous result generated by a previous MAC instruction.

14. The apparatus of claim 13, wherein the addition instruction receives carry input from a mask register and stores carry output into the mask register.

15. A system comprising:
an interconnect;
a processor coupled to the interconnect, the processor including:
decoding logic to receive and decode a multiply-and-accumulate (MAC) instruction for unsigned integer operations, the MAC instruction to indicate a first vector register as a first operand, a second vector register as a second operand, and a third vector register as a destination, the first vector register to store a first factor and the second vector register to store a partial sum of the MAC instruction;
execution logic coupled to the decoding logic to multiply the first factor with an implicit second factor to generate a product, and to add the partial sum to the product to generate a result, wherein the first factor, the implicit second factor and the partial sum have a same data width and the product has twice the data width; and
a set of vector registers coupled to the execution logic, wherein the set of vector registers include the third vector register to store a most significant half of the result, and the second vector register to store a least significant half of the result; and
a dynamic random access memory (DRAM) coupled to the interconnect.

16. The system of claim 15, wherein the first vector register stores a plurality of first factors of a plurality of multiplications, the second vector register stores a plurality of partial sums of the plurality of multiplications, and wherein the execution logic is to execute the MAC instruction to perform the plurality of multiplications in parallel.

17. The system of claim 15, wherein each of the first operand, the implicit second operand, the partial sum, the most significant half of the product and the least significant half of the product has the same data width (dw), and wherein the first, second and third vector registers belong to a set of vector registers, and wherein each vector register in the set has a vector width (VW) and includes (VW/dw) number of lanes with each lane used by one independent multiplication.

18. The system of claim 15, wherein one of the set of vector registers is loaded with the implicit second factor of the multiplication, and wherein the executing logic is to execute a sequence of MAC instructions to multiply the implicit second factor with a sequence of first factors.

19. The system of claim 18, wherein the MAC instruction is one of a sequence of MAC instructions for multiplying two unsigned integers, and wherein the first factor and the implicit second factor are fractional portions of the two unsigned integers, respectively, and wherein inputs to the MAC instruction are independent of outputs of a previous MAC instruction in the sequence.

20. The system of claim 15, wherein, subsequent to executing the MAC instruction, the execution logic in response to an addition instruction is to add the least significant half of the result to the most significant half of a previous result generated by a previous MAC instruction.

21. The system of claim 20, wherein the addition instruction receives carry input from a mask register and stores carry output into the mask register.

* * * * *